P. COVAL & D. A. KUNKLE.
TROLLEY.
APPLICATION FILED NOV. 3, 1908.
921,512.
Patented May 11, 1909.
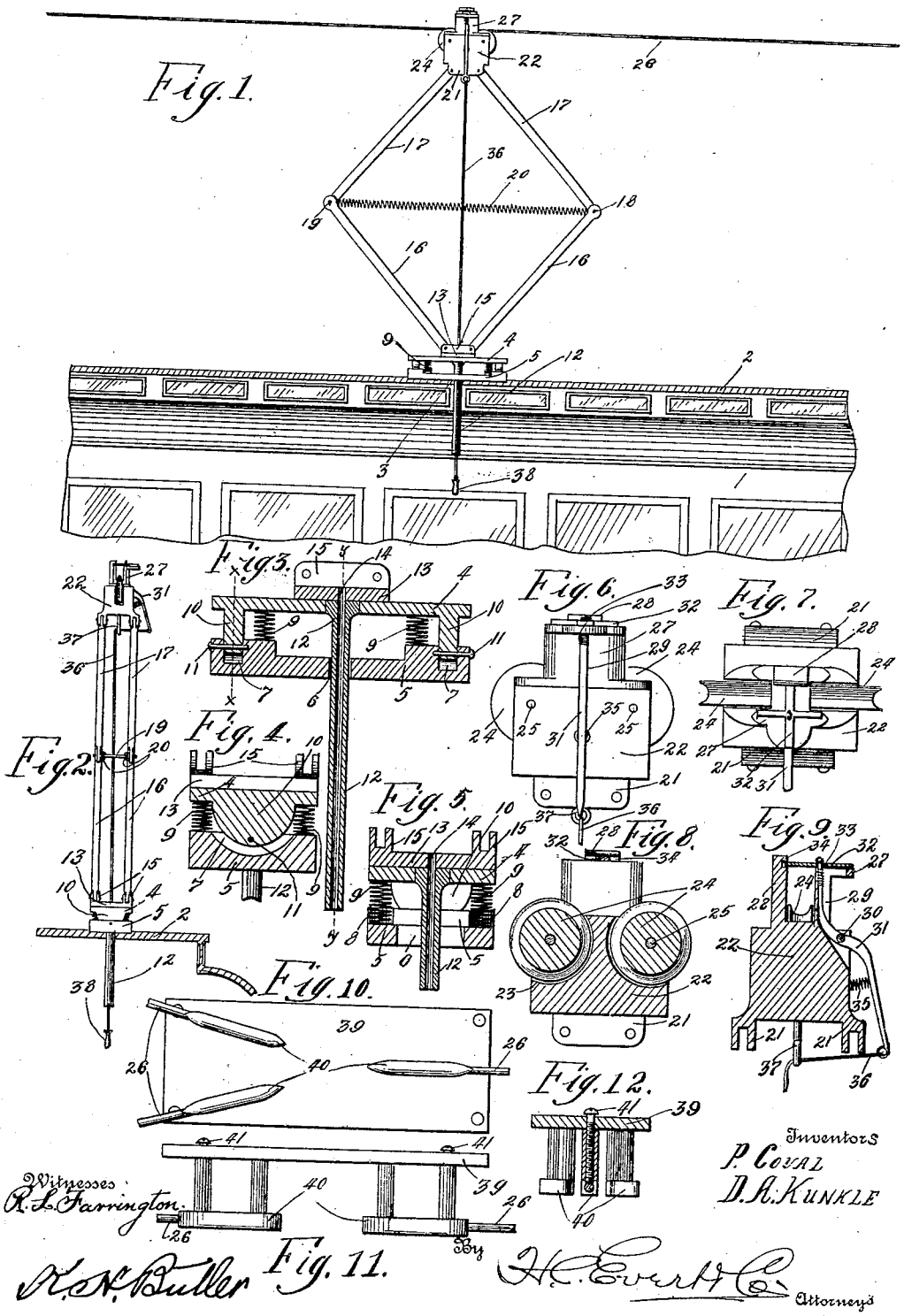
Witnesses
R. L. Farrington.
K. N. Butler
Inventors
P. Coval
D. A. Kunkle
By H. C. Evert & Co.
Attorneys

UNITED STATES PATENT OFFICE.

PETER COVAL AND DANIEL A. KUNKLE, OF NEW KENSINGTON, PENNSYLVANIA.

TROLLEY.

No. 921,512.  Specification of Letters Patent.  Patented May 11, 1909.

Application filed November 3, 1908. Serial No. 460,908.

*To all whom it may concern:*

Be it known that we, PETER COVAL and DANIEL A. KUNKLE, citizens of the United States of America, residing at New Kensington, in the county of Westmoreland and State of Pennsylvania, have invented certain new and useful Improvements in Trolleys, of which the following is a specification, reference being had therein to the accompanying drawing.

This invention relates to trolleys, and more particularly to that type of trolley known as a pentagraph trolley, wherein pivoted arms are employed for maintaining the trolley wheels upon the trolley wire or electrical conductor.

The primary object of our invention is the provision of novel means in connection with a trolley of the above type for placing trolley wheels upon a wire without leaving the car, said means being manipulated from within the car directly beneath the trolley.

A further object of our invention is to provide a trolley harp of a novel construction with a star wheel for normally closing and retaining a trolley wire upon the trolley wheels, whereby said trolley wheels cannot become accidentally displaced due to irregularities in the trolley wire, overhead construction, bridge work, and sharp curves.

A still further object of this invention is to provide a trolley harp with two trolley wheels, both of which will be normally retained in engagement with the trolley wire, and easily removed when it is desired to transfer the trolley wheels from one wire to another.

With the above and other objects in view which will more readily appear as the invention is better understood, the same consists in the novel construction, combination and arrangement of parts to be presently described and then specifically claimed.

In the drawings:—Figure 1 is a side elevation of a trolley constructed in accordance with our invention, Fig. 2 is a front elevation of the same, Fig. 3 is a longitudinal section of the trolley base, Fig. 4 is a cross sectional view taken on the line x—x of Fig. 3, Fig. 5 is a similar view taken on the line y—y of Fig. 3, Fig. 6 is an enlarged side elevation of the trolley harp, Fig. 7 is a plan of the same, Fig. 8 is a longitudinal sectional view of the harp, Fig. 9 is a cross sectional view of the same, Fig. 10 is a bottom plan of a trolley plate and hanger, Fig. 11 is a side elevation of the same, and Fig. 12 is a cross sectional view of the trolley plate and hanger.

In the accompanying drawings, 1 designates a car having the roof 2 thereof provided with a central vertical opening 3. Mounted upon the roof 2 is a trolley base comprising oblong plates 4 and 5. The plate 5 is provided with a slot 6 adapted to register with the opening 3 of the car roof 2. The ends of the plate 5 are provided with transverse grooves 7 and with sockets 8, said sockets being arranged at the side edges of the plate 5 for springs 9 interposed between the plate 5 and the plate 4. The plate 4 is provided with depending rockers 10 which are pivotally mounted in the grooves 7 by longitudinal pins 11.

Mounted centrally of the plate 4 is a depending tube 12 extending through the slot 6 of the plate 5 and the opening 3 of the car roof 2. This tube can be gripped for rocking the plate 4, whereby the trolley wheels can be placed upon the trolley wire, as will hereinafter appear. A plate 13 is mounted on the plate 4 and has a central opening 14 alining vertically with the bore of the tube 12 said plate being suitably secured to the plate 4, as by bolts (not shown). This plate 13 is provided with two sets of lugs 15 for pivoted arms 16, said arms extending upwardly at an inclination and connected to arms 17 by pivot pins 18 and 19. The pivot pins 18 and 19 are connected together by a longitudinally disposed retractile spring 20. The upper ends of the arms 17 are pivotally connected to depending lugs 21 carried by a trolley harp 22. The ends of this trolley harp are cut away, as at 23, to accommodate longitudinally disposed trolley wheels 24 journaled upon pins 25 arranged transversely of the harp 22. The trolley wheels 24 are adapted to engage a wire or a similar electrical conductor 26 and are retained in engagement with said wire by the retractile spring 20 supporting the arms 16 and 17 in an elevated and non-collapsible position.

The top of the harp is provided with vertical guards 27 and 28, the guard 27 being slotted, as at 29.

Pivotally mounted in the side of the harp by a pin 30 is a lever 31, said lever extending up into the slotted guard 27. Upon the upper end of the lever is rotatably mounted a horizontal star wheel 32, which is normally held stationary by a coil spring 33 fixed to the upper end of the lever 31 and bearing against the upper face of said star wheel thus frictionally holding the star wheel against rotation. The star wheel is positioned whereby one arm thereof will extend into a groove 34 provided therefor in the guard 28. Interposed between the lever 31 and the harp 22 is a coil spring 35, which normally holds the upper end of the lever 31 in engagement with the guard 27.

Attached to the lower end of the lever 31 is a cable 36 extending through a depending eyebolt 37 carried by the harp 22. The cable extends downwardly through the opening 14 of the plate 13 and through the tube 12, the lower end of the cable within the car being provided with a suitable handle 38.

In the drawings we have illustrated a trolley plate or hanger 39 used at the juncture of two or more trolley wires.

The plate 39 is provided with depending trolley wire holders 40 in which the ends of trolley wires are secured by set screws 41, the plate serving as a conductor between said wires. I have simply illustrated this plate as one type of trolley plate or hanger in connection with which my trolley can be used.

In operation, the star wheel 32 is adapted to rotate when impinged by a trolley hanger or similar structure, the star wheel normally remaining in a position that will prevent the trolley wire 26 from becoming accidentally disengaged from the wheels 24. However, should the trolley harp become accidentally displaced from the trolley wire 26, the cable 36 can be pulled downwardly to swing the star wheel 32 to one side and allow the trolley wheels 24 to be again placed upon the trolley wire 26. For shifting the harp directly beneath the wire 26, the tube 12 is gripped and moved to rock the plate 4. The springs 9 are adapted to normally maintain the movable plate 4 in a horizontal position with the pivoted arms 16 and 17 vertical relative to the roof 2 of the car.

While in the drawings forming a part of this application there is illustrated the preferred embodiments of our invention, it is to be understood that the same can be varied or changed as to shape, proportion and manner of assemblage without departing from the spirit of the invention.

Having now described our invention, what we claim as new, is:—

1. In a trolley, the combination with a car, of a trolley base carried by the roof of said car, said base comprising two plates, rockers carried by one of said plates and pivotally connecting with the other of said plates, springs interposed between said plates, a depending tube carried by one of said plates and extending through the other of said plates into said car, arms pivotally connected together and to one of said plates, a coil spring connecting the pivoted points of said arms, a harp supported by said arms, trolley wheels journaled in said harp and adapted to engage said wire, guards arranged upon said harp at the sides of said wheels, a lever pivotally connected to the side of said harp, a horizontal revoluble star wheel carried by the upper end of said lever, and adapted to engage one of said guards, and a cable connecting with said lever and extending downwardly between said arms through the tube of said trolley base whereby said cable can be pulled to lower the harp.

2. In a trolley, the combination with a car, of a trolley base carried by the roof of said car, said base comprising two plates, rockers carried by one of said plates and pivotally connecting with the other of said plates, springs interposed between said plates, a depending tube carried by one of said plates and extending through the other of said plates into said car, arms pivotally connected together and to one of said plates, a coil spring connecting the pivoted points of said arms, a harp supported by said arms, trolley wheels journaled in said harp and adapted to engage said wire, guards arranged upon said harp at the sides of said wheels, a lever pivotally connected to the side of said harp, a horizontal revoluble star wheel carried by the upper end of said lever, and adapted to engage one of said guards, and means connecting with said lever and extending through the tube of said trolley base for moving said harp.

3. In a trolley, the combination with a car, of a plate secured to the roof of said car and having an opening formed therein, a plate movably supported by the first mentioned plate, a tube carried by said plate and extending through the opening of the first mentioned plate into the car, pivoted arms carried by said movable plate, a spring connecting said arms, a harp carried by said arms, trolley wheels journaled in said harp for engaging said wire, a lever pivotally carried by the side of said harp, a horizontal star wheel carried by the upper end of said lever, and a cable connecting with said lever and extending through said tube into said car, substantially as described.

4. A trolley comprising a base plate, a movable plate arranged upon said base plate, a depending tube carried by said movable plate and extending through said base plate into said car, pivoted arms carried by said movable plate, a harp supported by said arms, trolley wheels journaled in said harp, a lever carried by the side of said harp, a horizontal star wheel carried by the upper end of said lever and means connecting with said lever and extending through said tube for moving said harp, substantially as described.

In testimony whereof we affix our signatures in the presence of two witnesses.

PETER COVAL.
DANIEL A. KUNKLE.

Witnesses:
MAX H. SROLOVITZ,
C. V. BROOKS.